United States Patent [19]
Sakota et al.

[11] Patent Number: 5,376,967
[45] Date of Patent: Dec. 27, 1994

[54] METHOD AND APPARATUS FOR DRIVING A HIGH RESOLUTION CCD IMAGE PICKUP DEVICE BY TRANSFERRING EMPTY PACKETS

[75] Inventors: Akio Sakota; Hiroshi Tanigawa, both of Miyagi, Japan

[73] Assignee: Fuji Photo Film Co., Ltd., Tokyo, Japan

[21] Appl. No.: 972,559

[22] Filed: Nov. 6, 1992

[30] Foreign Application Priority Data

Nov. 11, 1991 [JP] Japan ................................. 3-291468

[51] Int. Cl.$^5$ ............................................. H04N 3/14
[52] U.S. Cl. ...................................... 348/311; 348/312
[58] Field of Search ...................... 358/213.23, 213.29, 358/213.15, 213.16, 213.11, 213.31; 348/311, 312, 313, 294, 322

[56] References Cited

U.S. PATENT DOCUMENTS

| | | | |
|---|---|---|---|
| 4,178,614 | 12/1979 | Sauer | 348/320 |
| 4,745,481 | 5/1988 | Tanaka | 358/213.29 |
| 4,868,855 | 9/1989 | Boudewijns et al. | 377/60 |
| 4,951,148 | 8/1990 | Esser et al. | 358/213.15 |
| 5,105,450 | 4/1992 | Yamada | 358/213.31 |

Primary Examiner—Joseph Mancuso
Assistant Examiner—Wendy R. Greening
Attorney, Agent, or Firm—Sughrue, Mion, Zinn, Macpeak & Seas

[57] ABSTRACT

A method of driving a solid state image pickup device having a number of photoelectric conversion elements disposed in a matrix shape, a plurality of columns of vertical CCDs disposed adjacent to each column of the photoelectric conversion elements and capable of storing electric charges accumulated in the photoelectric conversion elements, and a horizontal CCD connected to the vertical CCDs and capable of receiving in parallel electric charges transferred from the vertical CCDs and serially outputting the electric charges. The method includes the steps of reading electric charges accumulated in the photoelectric conversion elements and storing the electric charges in the vertical CCDs sending an empty packet from the horizontal CCD to each of the vertical CCDs, the empty packet representing an area where no electric charge is present and causing electric charges in the vertical CCDs to be sequentially transferred to the horizontal CCD in relation to the empty packet being transferred form the horizontal CCD to the vertical CCDs.

7 Claims, 9 Drawing Sheets

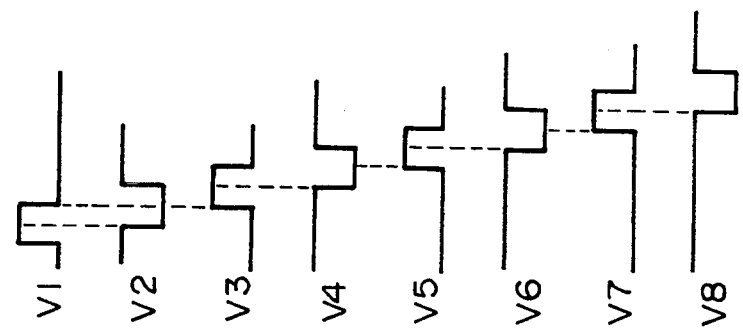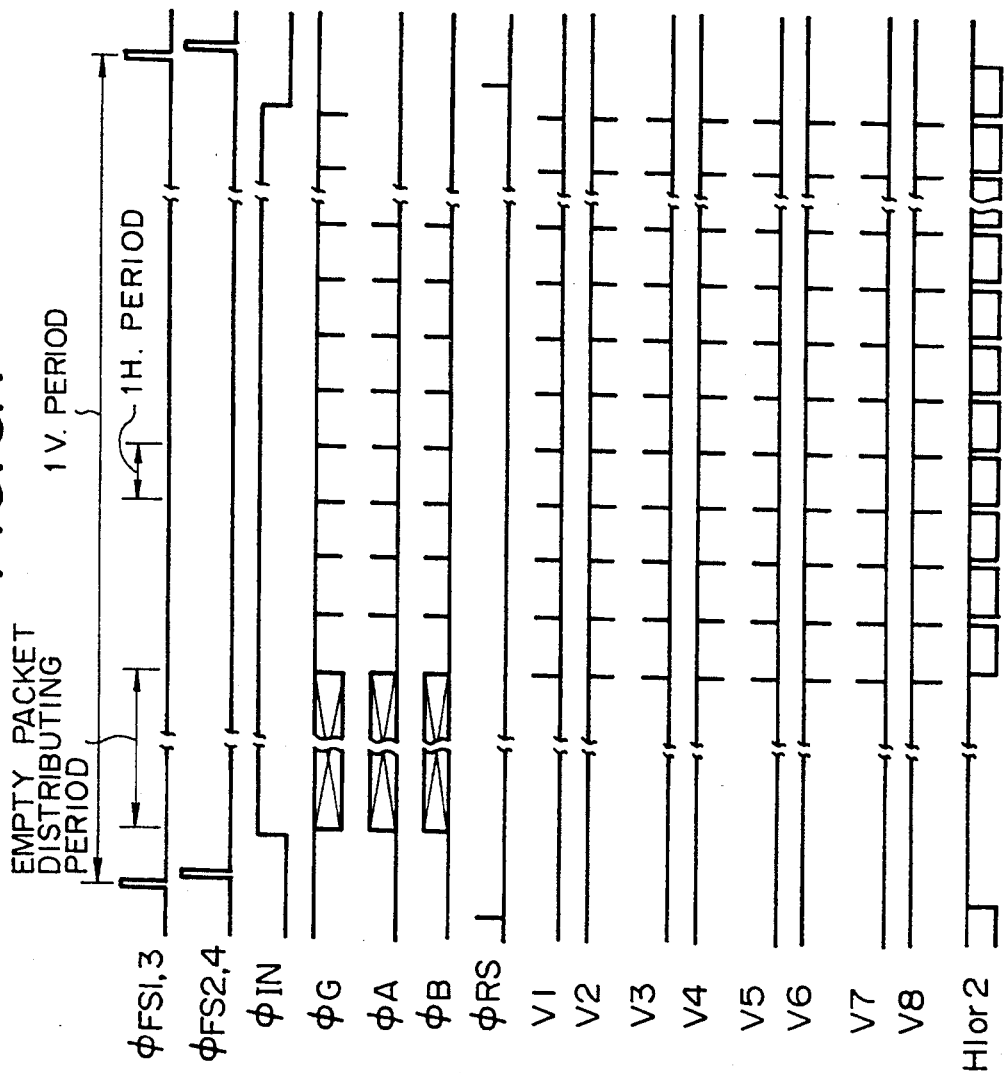

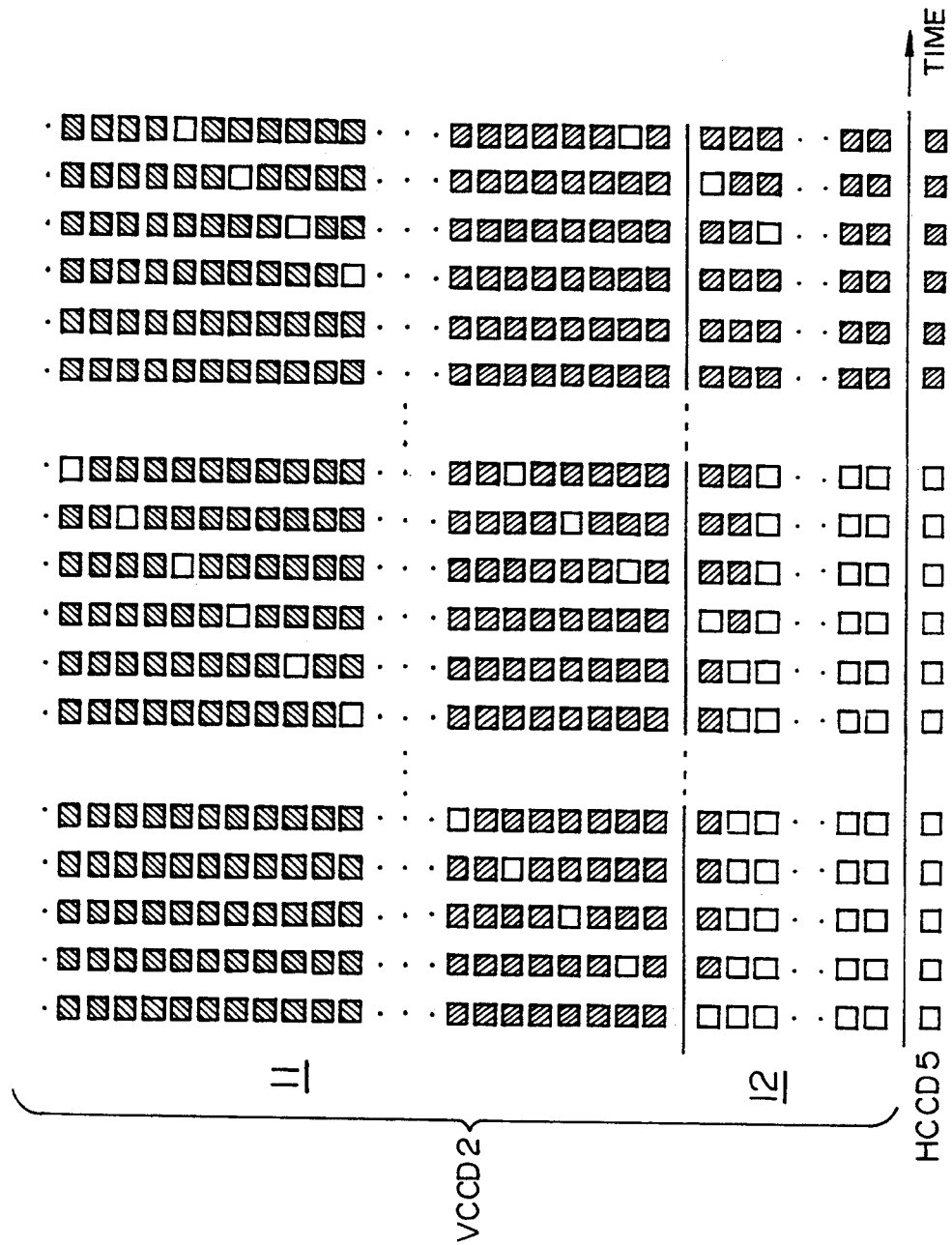

METHOD AND APPARATUS FOR DRIVING A HIGH RESOLUTION CCD IMAGE PICKUP DEVICE BY TRANSFERRING EMPTY PACKETS

BACKGROUND OF THE INVENTION

1. Field of the Invention

The present invention relates to an image pickup device, and more particularly to driving a solid state image pickup device made of photoelectric conversion elements such as semiconductor photodiodes, and charge-coupled devices.

2. Description of the Related Art

CCD transfer type solid state image pickup devices are known which are used with electronic cameras, copiers, and other video apparatus. A number of photodiodes are disposed in the vertical and horizontal directions to form a pixel matrix.

A vertical charge transfer path (VCCD) is formed adjacent to each photodiode column, and a horizontal charge transfer path (HCCD) is formed near the ends of respective VCCDs.

Reducing the size of a solid state image pickup device is strongly requested nowadays. The number of pixels of a solid state image pickup device in the vertical direction is stipulated by the specification of NTSC, PAL or the like. The number of photodiodes of an image pickup device is therefore the same for all chip sizes regardless of how much they are reduced, such as from 1 inch to ⅔ inch, ½ inch, and to ⅓ inch.

Three or more transfer electrodes per one photodiode are required in order to read electric charges of all photodiodes separately at the same time. There comes a limit of fine patterning as the chip size is reduced, and so it becomes impossible to form three or more electrodes per one photodiode.

According to the specification of NTSC, PAL, or the like, interlaced image signals are used and one frame is formed by scanning every other line twice. In this case, VCCDs having two transfer electrodes per one photodiode row can be used.

When light of an electronic flash lamp is used, the exposure start time is the same for all photodiodes. If the exposure end time is different, a total exposure time period becomes different. From the standpoint of the resolution of a moving image, a different exposure time period is not desirable. It is also desirable to have as many pixels as possible, in order to obtain a very fine image. Therefore, for taking a very fine still image under an electronic flash lamp light, it is desirable to read electric charges of all photodiodes at the same time.

As a method of reading all electric charges of an image pickup device of this type at the same time, an accordion transfer method has been proposed (PHILIPS TECHNICAL REVIEW, Vol. 43, No. 1/2, 1986, A. J. P. Theuwissen and C. H. L. Weijtens).

FIGS. 8A and 8B illustrate the operation of the accordion transfer method. FIG. 8A is a conceptual diagram showing how the potentials under electrodes along the transfer path change with time. FIG. 8B is a conceptual plan diagram showing how electric charges are transferred by using the accordion transfer method.

Throughout this specification, the term "potential" is intended to mean a potential energy, the lower potential having a stable state irrespective of the polarity of electric charges.

Referring to FIG. 8A, electrodes along the transfer path include odd numbered electrodes Od and even numbered electrodes Ev. A cell of the charge transfer path is formed under each electrode. The potentials under the odd numbered electrodes are lowered first to form potential wells in which electric charges qa, qb, and qc are stored. If the potential barriers between potential wells are lowered in this state, the electric charges will be mixed.

In order to avoid such a charge mixture, the potential under the rightmost even electrode is lowered first to extend the potential well in length by an amount corresponding to two electrodes. Therefore, the electric charge qa distributively propagates to the right by a one-electrode length. Next, the potential at the left portion of the potential well storing the electric charge qa is raised, and at the same time the potential at the right portion of the potential barrier is lowered. As a result, the electric charge qa is transferred to the right by a one-electrode length while being distributed over the two-electrode length.

At this time, a potential barrier corresponding to a two-electrode length is formed between the electric charges qa and qb. To transfer the electric charge qa farther to the right, an operation of raising the potential at the left portion of the well and at the same time lowering the potential at the right portion is repetitively carried out.

After the potential barrier corresponding to the two-electrode length is formed between the electric charges qa and qb, the potential of this barrier on the right side of the electric charge qb is lowered. As a result, the electric charge qb distributively propagates to the right by a two-electrode length. At this time, there is a potential barrier corresponding to at least one-electrode length, or two-electrode length in an ordinary case, between the electric charges qa and qb, preventing a charge mixture. In the manner described above, electric charges stored in wells at every other electrode are extended by a two-electrode length to transfer the charges.

FIG. 8B conceptually shows the distribution of electric charges transferred in the above manner. The abscissa represents time, and the ordinate represents electrodes along the transfer path. Under the state shown at the leftmost, electric charges qa, qb, qc, and qd are stored under every other electrode at the upper half of the transfer path. These electric charges are sequentially transferred downward, starting from the electric charge at the lowest position, while forming a potential well corresponding to a two-electrode length and a potential barrier corresponding to a two-electrode length.

Namely, during the charge transfer, an electric charge is distributively propagated by a two-electrode length and a potential barrier corresponding to a two-electrode length is formed between electric charges. It is therefore possible to transfer electric charges stored under every other electrode while preventing a charge mixture. Under the charge transfer completion state shown at the rightmost, the electric charges qa, qb, qc and qd distribute at every other electrode and take the original distribution pattern.

The manner of forming potential wells and barriers during the charge transfer is analogous to gradually opening and then closing the bellows of a musical instrument, like an accordion. This is the reason why this charge transfer method is called an accordion transfer method.

As shown in the potential diagram of FIG. 8A, the accordion transfer method uses four-phase drive signals.

The present application has proposed a charge transfer method similar to the above-described accordion transfer method. The proposed method is directed to a solid state image pickup device having a photodiode matrix, vertical charge transfer paths and horizontal charge transfer paths. According to the proposed method, not photodiodes but CCDs are used for the transfer path, and charges are transferred in response to four-phase drive signals like those for an interline type CCD. However, only one signal per two photodiode rows is allowed to be transferred.

FIGS. 9A and 9B show an FIT pseudo frame electronic shutter proposed by the present applicant. FIG. 9A is a schematic plane view showing the structure of the shutter, and FIG. 9B is a conceptual diagram showing the operation of the shutter.

Referring to FIG. 9A, a number of photodiodes P are disposed in a matrix shape, for example, by doping n-type impurities in a p-type silicon substrate. A plurality of charge transfer paths L made of CCDs are formed near respective columns of the photodiodes.

Transfer gates G are formed between the photodiodes P and the charge transfer paths L. Two electrodes per each photodiode row are formed on the charge transfer paths L.

Each charge transfer path L has a light receiving section R and a charge accumulating section S extending from the photodiode area to the area where the photodiodes are not formed. An HCCD is connected to the ends of the charge accumulation sections of the charge transfer paths L. An output from HCCD is read via a charge detecting amplifier.

The photodiodes P distributed in the matrix shape include odd numbered photodiodes PA and even numbered photodiodes PB, the former forming an A field and the latter forming a B field. The two fields A and B form one frame of an image.

If electric charges are read from all photodiodes at the same time and transferred, a charge mixture occurs because the charge transfer path has only two electrodes per one photodiode row.

The following operation is performed in order to read electric charges from all photodiodes without a charge mixture.

FIG. 9B shows the outline of reading electric charges from the photodiodes shown in FIG. 9A.

Electric charges stored in the odd numbered photodiodes PA are first read and stored in the charge transfer paths L at the light receiving section L (R). In this case, one electric charge signal per four electrodes is read and stored in the charge transfer path L.

Next, the electric charges read and stored in the charge transfer paths L (R) at the light receiving section R are transferred to the charge transfer paths L (S) at the charge accumulating section S. This charge transfer may be performed by using four-phase drive signals, without a charge mixture.

After the electric charges stored in the odd numbered photodiodes are transferred to the charge transfer paths L (S) at the charge accumulating section, electric charges stored in the even numbered photodiodes PB are read and stored in the charge transfer paths L (S) at the light receiving section. In this manner, the electric charges of the a field are stored in the charge transfer paths L at the charge accumulating section, and the electric charges of the B field are stored in the charge transfer paths L at the light receiving section.

Next, while holding in position the electric charges in the charge transfer paths L (R) at the light receiving section, the electric charges in the charge transfer paths L (S) at the charge accumulating section are sequentially transferred one row after another to the HCCD. The electric charges in the HCCD are transferred in the horizontal direction and picked up from the charge detecting amplifier.

After all the electric charge signals of the A field stored at the charge accumulating section have been read, the electric charge signals stored in the charge transfer paths L (R) at the light receiving section are transferred downward and sent one row after another to the HCCD. The electric charges in the HCCD are transferred in the horizontal direction and picked up from the charge detecting amplifier.

In the above manner, electric charge signals stored in all the photodiodes PA and PB can be read. With this method, however, the image taking times required for the A and B fields are a little different, and the images are picked up at a little different times. Electric charges in the electric charge transfer paths L are transferred by four-phase drive signals like those for an interline type CCD.

In the accordion or domino transfer method, electric charges are transferred while being extended along the charge transfer paths. Accordingly, the electric charges stored in the charge transfer paths at its upper section are required to be held in position for a longer time period than the electric charges stored in the charge transfer paths at its lower section.

SUMMARY OF THE INVENTION

It is an object of the present invention to provide a method of driving a solid state image pickup device capable of suppressing dark current from being generated.

It is another object of the present invention to provide a solid state image pickup device capable of suppressing dark current from being generated.

Dark current generates in a charge transfer path. Conventionally, electric charges read from photodiodes and stored in charge transfer paths are held in position for certain time periods which take different values depending upon the positions at the transfer paths, and thereafter transferred. Although dark current is small if the charge transfer is performed at a short cycle period, it increases in amount if it is held in position for a longer time period.

The amplitude of dark current is not uniform throughout the transfer paths, but it has a positional distribution or variation. Therefore, dark current for an electric charge signal held in position for a longer time period has a fixed distribution pattern.

According to one aspect of the present invention, there is provided a method of driving a solid state image pickup device having a number of photoelectric conversion elements disposed in a matrix shape, a plurality column of vertical CCDs disposed adjacent to each row of the photoelectric conversion elements and capable of pickup up electric charges accumulated in the photoelectric conversion elements, and a horizontal CCD connected to the plurality column of vertical CCDs and capable of parallel receiving electric charges transferred from the vertical CCDs and serially outputting the electric charges, the method comprising the steps of: reading electric charges accumulated in all of a number of photoelectric conversion elements and storing the electric charges in the vertical CCDs; sending an empty packet from the horizontal CCD to each of the vertical CCDs, the empty packet representing an area where no electric charge is present; and under the condition that empty packets are distributed in the vertical CCDs, at a predetermined cycle period that an empty packet moves in each of the vertical CCDs two rows or more, transferring electric charges of one row at the horizontal CCD and sending empty packets of one row to the vertical CCDs.

While electric charges of one row are transferred in the horizontal CCD, an empty packet moves more than two rows in the vertical CCD. Therefore, an empty packet moves in VCCD at a high speed. In this case, electric charges in the vertical CCD change their positions because of moving empty packets.

The effect of dark current associated with stored electric charges becomes conspicuous the longer the electric charges stay at the same positions. By moving electric charges at a predetermined cycle period, the effect of dark current associated with electric charges is lessened.

When stored electric charges change their positions, the effect of dark current having a positional distribution is averaged, preventing fixed pattern noises from being generated.

In the method of reading electric charges from photoelectric conversion elements at the same time and storing the charges in VCCD and sequentially transferring the charges to HCCD to read image signals, empty packets are transferred in the direction opposite to that of electric charges. It is therefore possible to move the positions of electric charges at the upper section of VCCD, suppressing the generation of dark current and preventing fixed pattern noises from being generated.

BRIEF DESCRIPTION OF THE DRAWINGS

FIGS. 6A and 6B are timing charts of control signals realizing the charge transfer of the embodiment shown in FIG. 4;

FIG. 7 is a conceptual diagram of a solid state image pickup device according to an embodiment of the present invention;

DETAILED DESCRIPTION OF THE PREFERRED EMBODIMENTS

Figure 1:
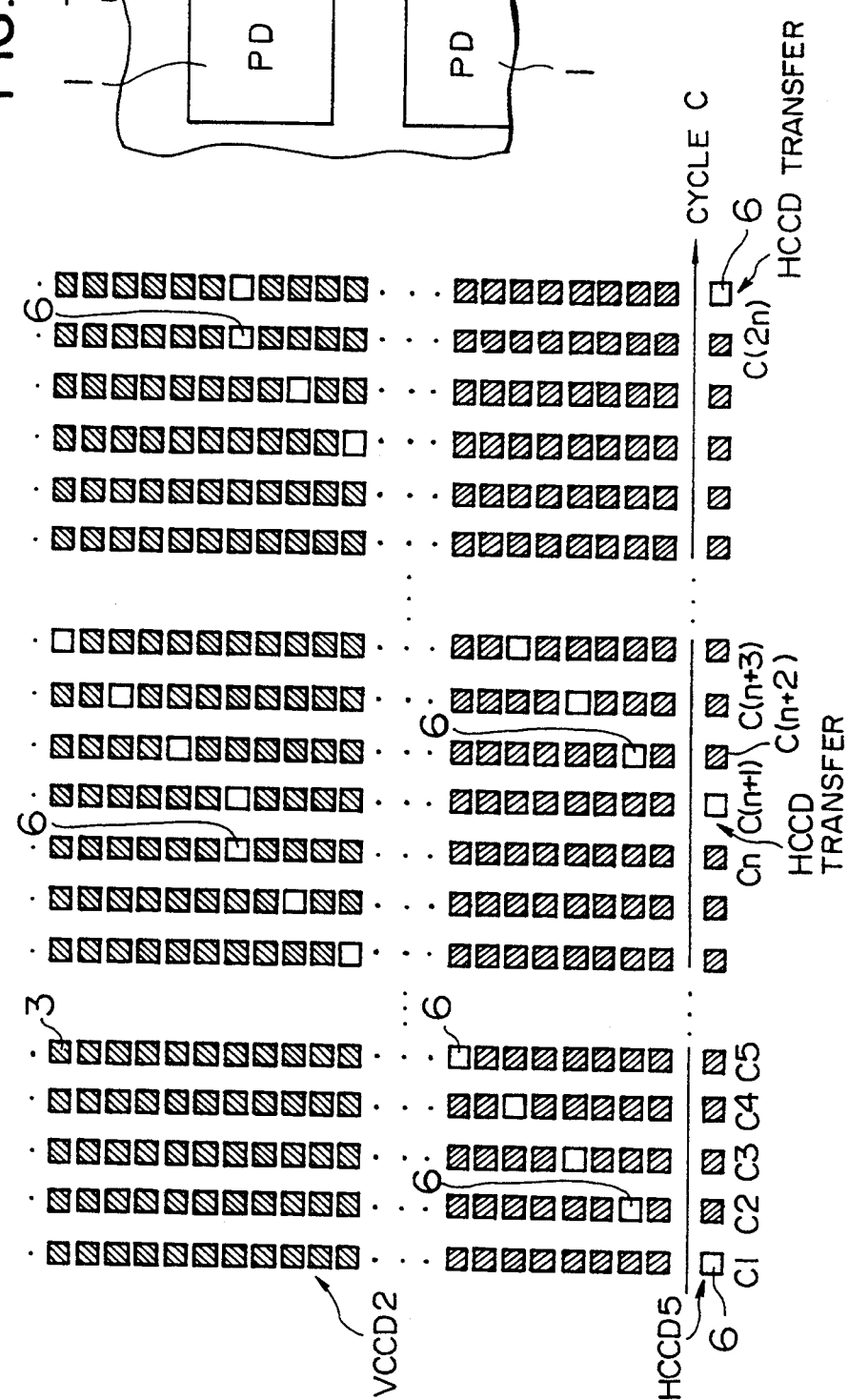
FIGS. 1A and 1B are a conceptual diagram showing the charge transfer and a schematic plan view of pixels according to an embodiment of the present invention.

FIGS. 1A and 1B show a method of driving a solid state image pickup device according to an embodiment of the present invention. FIG. 1A shows the electric charge distribution in a vertical CCD (VCCD) 2 and a horizontal CCD (HCCD) 5 relative to time. The electric charge distribution in the VCCD 2 and HCCD 5 is shown in the vertical direction and the time change is shown in the horizontal direction.

FIG. 1B shows the brief layout of photodiodes (PD) 1 serving as photoelectric conversion elements and the VCCD 2.

At a cycle C1 shown at the leftmost side in FIG. 1A, electric charges are read from all photodiodes 1 and stored in the VCCD 2.

As shown in FIG. 1B, two transfer electrodes 3 and 4 per one row are provided for the VCCD 2. One of the transfer electrodes 3 is connected via a transfer gate 7 to a corresponding photodiode 1.

Therefore, at the cycle C1 when electric charges are read from all the photodiodes 1 and stored in the VCCD 2, the electric charges are stored in the VCCD 2 under every other electrode 3. If the potential under the electrode 4 between the electrodes 3 under which the electric charges were stored, is lowered in this state, then a charge mixture occurs. In FIG. 1A, only the electrodes 3 are shown, and the electrodes 4 are not shown.

At the cycle C1, the HCCD 5 has no electric charge stored therein, but it has an empty packet 6.

At the next cycle C2, the empty packet 6 which was at HCCD 5 has been transferred to the area under the second lowest electrode of the VCCD 2. The electric charges stored in the areas under the lowest and second lowest electrodes have been transferred to the areas one row below.

In this case, the empty packet 6 can be fed to the VCCD without a charge mixture, by first transferring the electric charge in the area under the lowest electrode of the VCCD 2 to the HCCD 5 and then transferring the electric charge in the area under the second lowest electrode to the area under the lowest electrode.

At cycles C3, C4, and C5, the empty packet 6 is fed upward by two rows at each cycle. In this manner, at a cycle Cn the empty packet has been fed to the area under the {(n−1)*2}-th electrode as counted from the lowest electrode.

After one cycle period from the cycle C1 to cycle Cn, the electric charges in the HCCD 5 are transferred. As the electric charges in the HCCD 5 are transferred and outputted, empty packets corresponding to one row are generated in the HCCD 5. This state is shown at a cycle C(n+1).

At a cycle C(n+1) and following cycles up to the cycle C(2n), the empty packet 6 in HCCD 5 is sent into the VCCD 2 and sequentially fed upward in the VCCD 2. These cycles correspond to the cycles C2 to Cn.

In this manner, at the cycle C(2n), the empty packet 6 sent into VCCD 2 at the cycle C(n+2) has been fed to the predetermined position again. At the cycle C(2n+1), the electric charges in HCCD are transferred to generate empty packets in HCCD 5.

Repeating the above operations, the empty packet 6 moves upward in the VCCD 2*(n−1) rows each time the horizontal charge transfer of the HCCD 5 is carried out. As the empty packet 6 moves upward, the electric charge at the area under the electrode changes it position downward by one row.

The moving speed of the empty packet can be made sufficiently faster than, i.e., $2*(n-1)$ times, that of the electric charge. As a result, in the domino type charge transfer method of FIT charge transfer method, it is possible not to hold electric charges located far from the HCCD for a long period of time at the same place, and to change the positions of electric charges at a predetermined cycle time. The adverse effect of dark current can be reduced correspondingly, preventing its fixed pattern from being generated.

Figure 2:
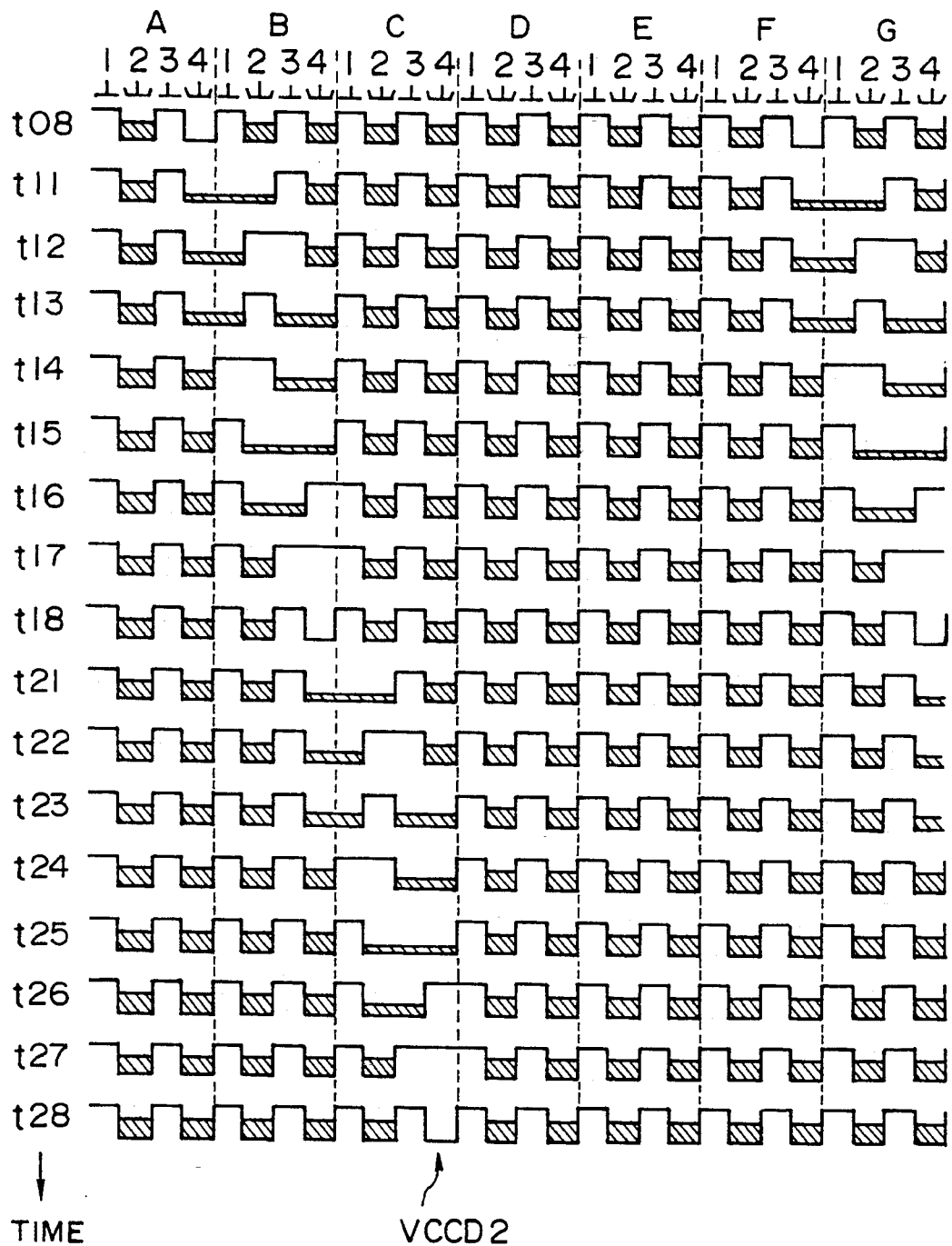
FIG. 2 is a potential diagram explaining the charge transfer in VCCD of the embodiment shown in FIGS. 1A and 1B.

FIG. 2 is a potential diagram showing the charge transfer in the VCCD. The ordinate represents a potential. If an electric charge is formed by electrons, the downward direction corresponds to the positive direction of voltage. The VCCD 2 is shown divided into two-row units in the lateral direction in FIG. 2, with characters A, B, C, . . . being affixed. In the ordinate direction in FIG. 2, the time change is shown. The time lapse of eight timings, e.g., from t11 to t18, corresponds to one cycle C shown in FIG. 1A.

In FIG. 1A, the empty packets are distributed one packet per $2*(n-1)$ rows. In the example shown in FIG. 2, the empty packets are distributed one packet per 10 rows. Furthermore, although only the electrodes on the VCCD which are connected to the photodiodes 1 are shown in FIG. 1A, electrodes 3 on the VCCD connected to photodiodes 1 as well as electrodes 4 between the electrodes 3 are shown in FIG. 2.

At time t08, empty packets are distributed at the areas under electrodes A4 and F4. At the next time t11, the potentials of B1 and G1 electrodes are set to a middle level VM to form potential wells under these electrodes. Therefore, electric charges under B2 and G2 electrodes are distributed over three electrodes A4 to B2 and F4 to G2.

At time t12, the potentials under B2 and G2 electrodes are raised. The electric charges distributed over the three electrodes are therefore squeezed to a two-electrode length under electrodes A4 and B1 and under electrodes F4 and G1.

At time t13, the potentials of the right portions of the potential barriers corresponding to a two-electrode length, i.e., the potentials under electrodes B3 and F3 are lowered to distribute the electric charges stored under electrodes B4 and G4, over two electrodes.

At time t14, the potentials under electrodes B1 and G1 are raised so that the electric charges distributed over two electrodes A4 and B1 and over two electrodes F4 and G1 are squeezed to a one-electrode length under electrodes A4 and F4. At this stage, the electric charges stored under electrodes B2 and F2 have moved one row and have been stored under electrodes A4 and F4.

At the next time t15, the potentials under electrodes B2 and G2 are lowered so that the potentials barriers corresponding to a two-electrode length are squeezed to a one-electrode length, and that the electric charges distributed over two electrodes B3 and B4 and over two electrodes G3 and G4 are distributed over three electrodes B2 to B4, and G2 to G4.

At times t16 and t17, the potentials under electrodes B4, B3 and G4, G3 are raised, respectively to squeeze the electric charges distributed over two electrodes to a one-electrode length. At this stage, the electric charges stored under electrodes B4 and F4 have moved by one row and have been stored under electrodes B2 and F2. At time t18, when the potentials under electrodes B4 and G4 are lowered, empty packets are generated under electrodes B4 and G4. In the above-described operations, the empty packets under electrodes A4 and F4 at time t08 have moved two rows to the positions B4 and G4 by the time t18. In other words, the empty packets move two rows while the electric charges at the B unit move one row.

The charge transfer during the period from time t11 to time t18 is performed by controlling the potentials under the electrodes at the B and G units only. During this period, the potentials in the A unit and C to F units are maintained still. Similar cycles are therefore repeated four times in order to transfer electric charges at the C to F units by one row.

During the period from time t21 to time t28, the potentials at the C unit and H unit (not shown) are controlled to perform operations like those from time t11 to time t18. With these operations, the empty packets under electrodes B4 and G4 move to the areas under electrodes C4 and H4 (not shown). The above-described charge transfer operations are repeated. It is possible to move the empty packets in the VCCD at a speed ten times as fast as the transfer speed of the electric charges.

The electric charges under electrodes B2 and B4 for example move to the areas under electrodes A4 and B2 in one cycle period from time t11 to time t18. Such a charge transfer suppresses dark current from being generated. Moreover, the time while the same electric charge stops at the same position is limited, so that a fixed pattern noise can be prevented.

Figure 3A:
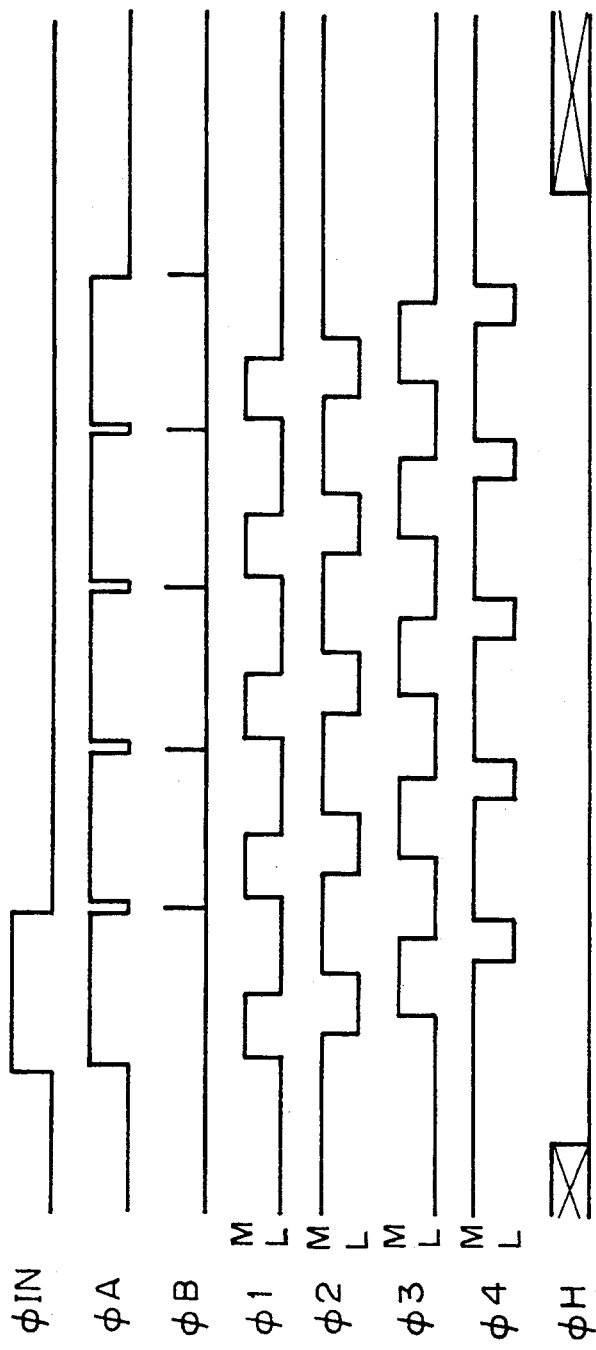
FIGS. 3A and 3B are timing charts of control signals realizing the charge transfer of the embodiment shown in FIGS. 1A and 1B.
Figure 3B:
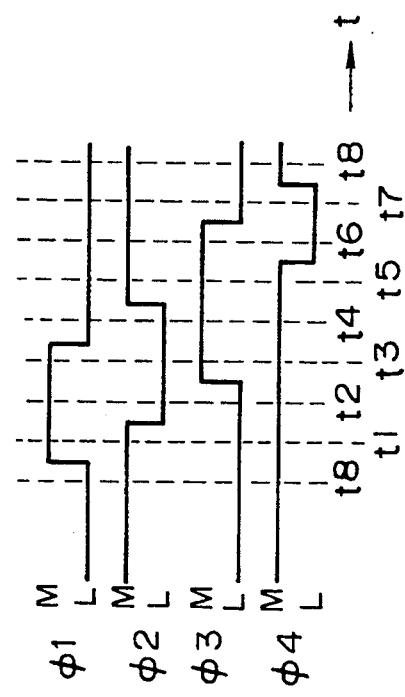

FIGS. 3A and 3B are timing charts of control signals for the charge transfer described with FIGS. 1A, 1B and 2. FIG. 3A shows input signals $\phi$IN, $\phi$A, and $\phi$B to a control circuit, drive signals $\phi$1, $\phi$2, $\phi$3, and m4 applied to four types of electrodes shown in FIG. 2, and a drive signal $\phi$H applied to the HCCD 5. FIG. 3B is a timing chart showing at a magnified scale the drive signals $\phi$1, $\phi$2, $\phi$3, and $\phi$4 applied to the four types of electrodes.

Referring to FIG. 3B, at time t8, the drive signals $\phi$1 and $\phi$3 take a low level L, and the drive signals $\phi$2 and $\phi$4 take a middle level M. This state corresponds to t08, t18, and t28 shown in FIG. 2.

At time t1, the drive signal $\phi$1 changes from the low level L to the middle level M. For example, the low level L is a potential of $-8$ to $-9$ V, and the middle level M is a potential of 0 V. When the drive signal $\phi$1 changes to the middle level M, the area under the corresponding electrode changes from the barrier state to the well state.

This state corresponds to electrodes B1 and G1 at time t11 and to electrode C1 at time t21, respectively shown in FIG. 2.

At time t2 in FIG. 3B, the drive signal m2 changes from the middle level M to the low level L. Upon this level change, the area under the corresponding second electrode changes from the well state to the barrier state. Time t2 in FIG. 3B corresponds to t12, t22, . . . shown in FIG. 2.

At time t2 in FIG. 3B, the drive signal $\phi$3 changes from the low level L to the middle level M. Upon this level change, the area under the corresponding third electrode changes from the barrier state to the well state. Time t3 in FIG. 3B corresponds to t13, t23, . . . shown in FIG. 2.

At time t4 in FIG. 3B, the drive signal $\phi$1 changes from the middle level M to the low level L. Upon this level change, the area under the corresponding first electrode changes from the well state to the barrier state. This state corresponds to t14, t24, ... shown in FIG. 2.

At time t5 in FIG. 3B, the drive signal φ2 changes from the low level L to the middle level M. Upon this level change, the area under the corresponding second electrode changes from the barrier state to the well state. This state corresponds to t15, t25, ... shown in FIG. 2.

At time t6 in FIG. 3B, the drive signal φ4 changes from the middle level M to the low level L. The area under the corresponding fourth electrode changes from the well state to the barrier state. This state corresponds to t16, t26, ... shown in FIG. 2.

At time t7 in FIG. 3B, the drive signal φ3 changes from the middle level M to the low level L. The area under the corresponding third electrode changes from the well state to the barrier state. This state corresponds to t17, t27, ... shown in FIG. 2.

At time t8 in FIG. 3B, the same state as at the first-mentioned time t8 is obtained. Wells and barriers are alternately formed in the VCCD. During the one cycle period from t1 to t8, the empty packets in the VCCD move two rows.

Such control signals are applied only to the electrode unit at which an empty packet to be moved is present. In other electrode units, electric charges are maintained still. For example, the middle level potential is applied to the area under the electrode 3 under which an electric charge is stored, and the low level potential is applied to the area under the electrode 4 not storing an electric charge but forming a barrier.

In the above embodiment, it is possible to distribute and transfer empty packets in the VCCD at a sufficiently high speed, e.g., as fast as several tens times the charge transfer speed from the VCCD to the HCCD. Electric charges stored in the upper section of the VCCD can change their positions quickly. Electric charges do not stop at the same area but they change their positions. Therefore, the generation of dark current can be suppressed, and a fixed pattern can be prevented.

In the above embodiment, every time an empty packet is fed from the HCCD to the VCCD and moves a predetermined distance in the VCCD, the charge transfer in the HCCD is performed. The electric charges stored in the VCCD at its upper section are held at the same area until the empty packet reaches the upper section. While the empty packet moves upward, the horizontal charge transfer is performed several times.

Figure 4:
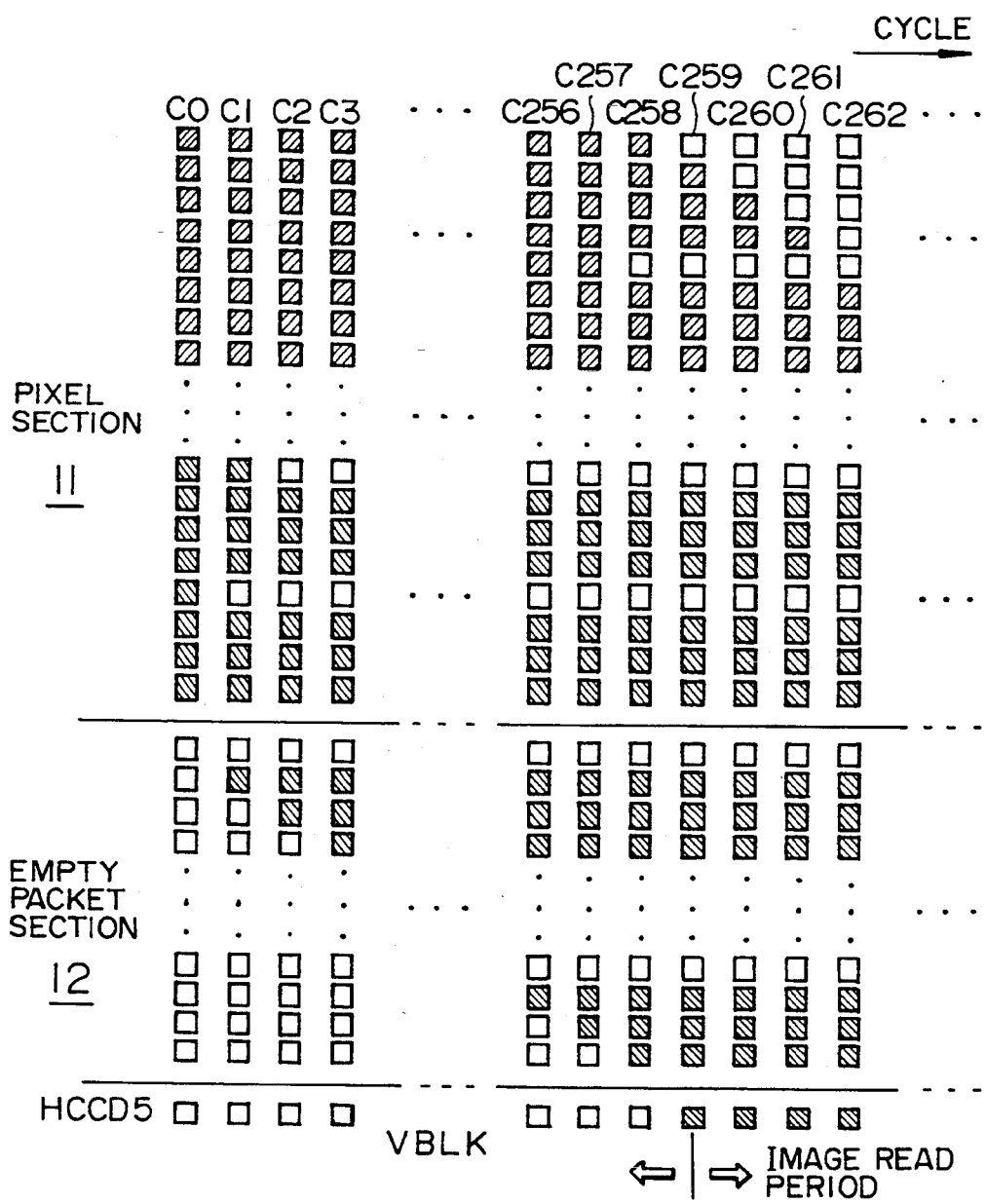
FIG. 4 is a conceptual diagram explaining a solid state image pickup device according to another embodiment of the present invention.

FIG. 4 shows another embodiment capable of distributing and transferring empty packets more quickly over the whole area of the VCCD by reducing the total time required for HCCD charge transfer. In FIG. 4, one column of the VCCD and HCCD is shown in the vertical direction, and the time change is shown in the horizontal direction.

The VCCD has a pixel section 11 with the number of rows corresponding to the number of photodiodes in one column, and an empty packet section 12 with the number of rows not corresponding to the number of photodiodes. In this embodiment, packets are distributed to every fourth row.

With the distribution of one packet per four rows, if the pixel section 11 has 1036 rows, electric charges corresponding to 259 rows overflow downward. If these overflown electric charges are to be stored with the same packet distribution, it is necessary for the empty packet section 12 to have 344 rows or 345 rows depending on the length of the VCCD and the number of rows existing between empty packets in the VCCD.

At cycle C0, electric charges are read from all photodiodes to the VCCD. In this state, all the rows of the pixel section 11 of the VCCD store the electric charges. Each row has two electrodes. In FIG. 4, only electrodes associated with photodiodes are shown.

At cycle C1, an empty packet is fed from the empty packet section 12 to the pixel section 11 of the VCCD. In this embodiment, it is assumed that an empty packet moves four rows during one cycle. At succeeding cycles C2 and C3, additional empty packets are sent to the pixel section 11, positioning at the fourth, eighth, and twelfth rows from the bottom of the pixel section 11.

Empty packets are sequentially sent to the VCCD in the above manner. If the empty packet section 12 has 344 rows, electric charges overflow from the pixel section 11 to the empty packet section 12 reach the bottom row of the empty section 12 at cycle C258.

At the next cycle C259, another empty packet is sent to the VCCD, and at the same time the electric charge overflown from the VCCD is transferred to HCCD. At this time, the electric charge transferred to HCCD 5 is transferred in the horizontal direction to read an image of one row.

At succeeding cycles C260, C261, ..., empty packets generated upon image transfer by the HCCD are sequentially sent to the empty packet section 12 of the VCCD 2. Therefore, an electric charge of one row is transferred to the HCCD and then transferred in the horizontal direction as read image signals. Such charge transfer method is described in U.S. patent application Ser. No. 07/945,604 and U.S. patent application Ser. No. 07/950,321, which are incorporated by reference.

In this embodiment, a process of distributing empty packets in the VCCD is performed during the vertical blanking period VBLK, and a process of reading image signals of each row is performed during the horizontal scan period. In this embodiment, the charge transfer in the VCCD is performed in units of four rows, and so eight-phase drive signals are used.

Figure 5:
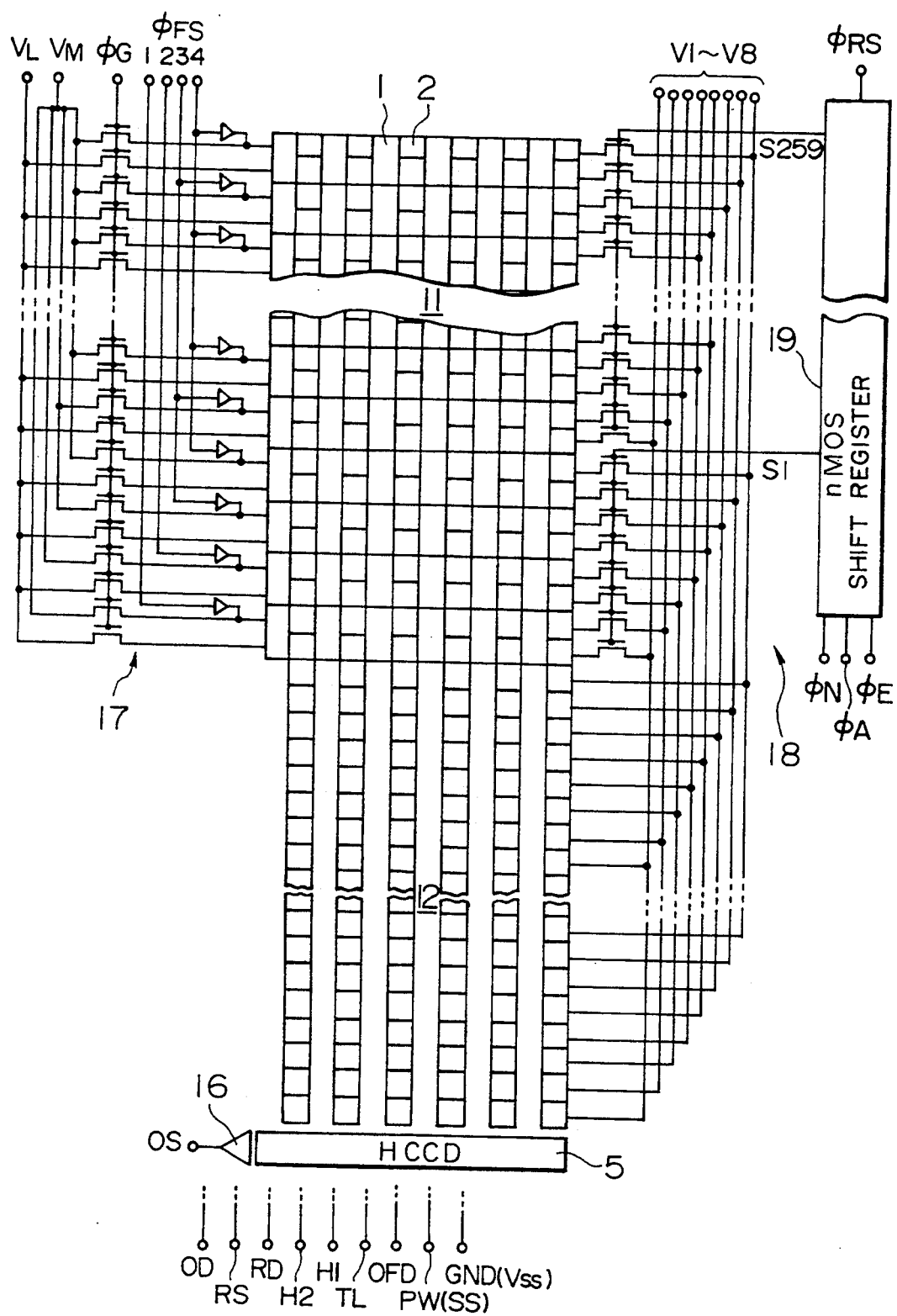
FIG. 5 is a circuit diagram showing the entirety of the solid state image pickup device with CCDs shown in FIG. 4.
Figure 8A:
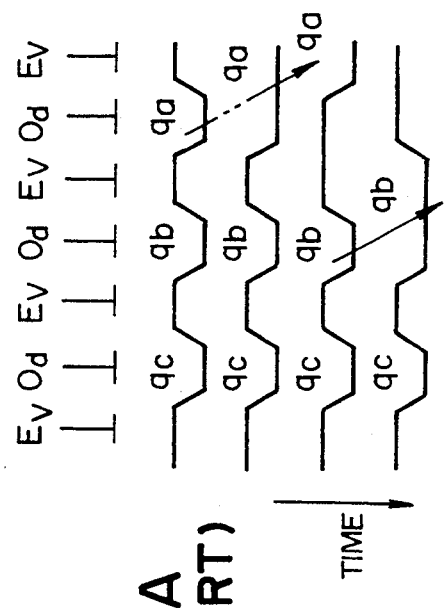
FIGS. 8A and 8B are conceptual diagrams explaining an accordion transfer method according to a prior art.
Figure 8B:
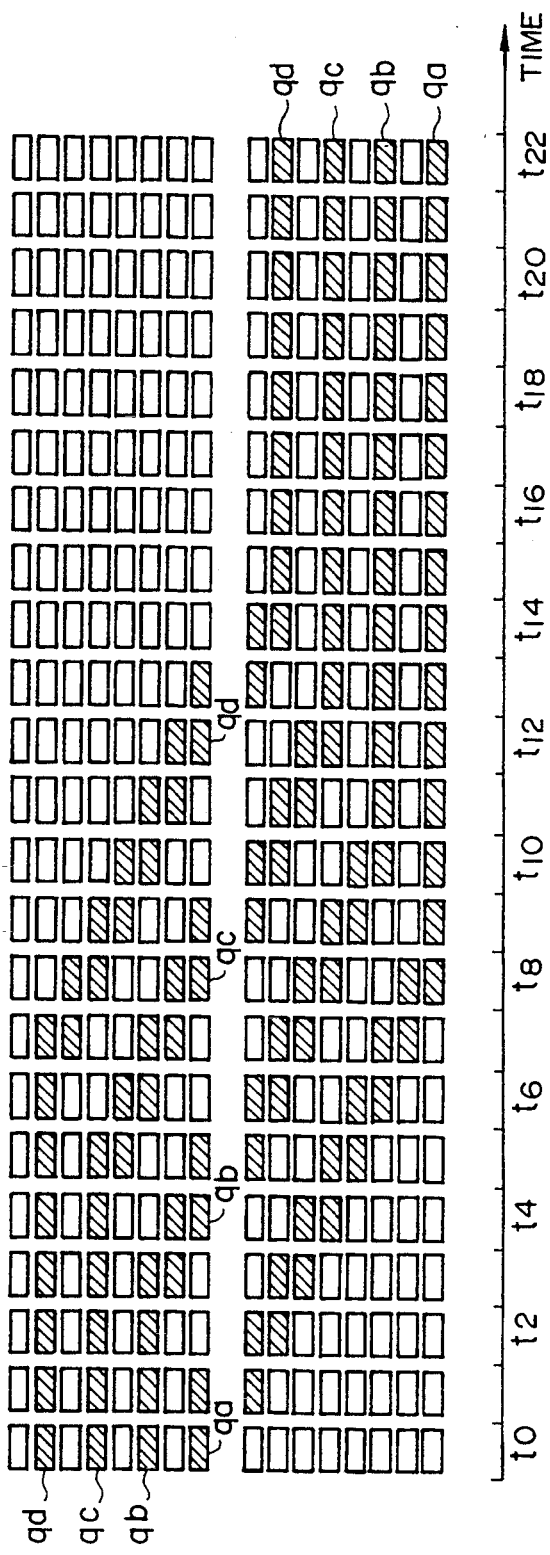
Figure 9A:
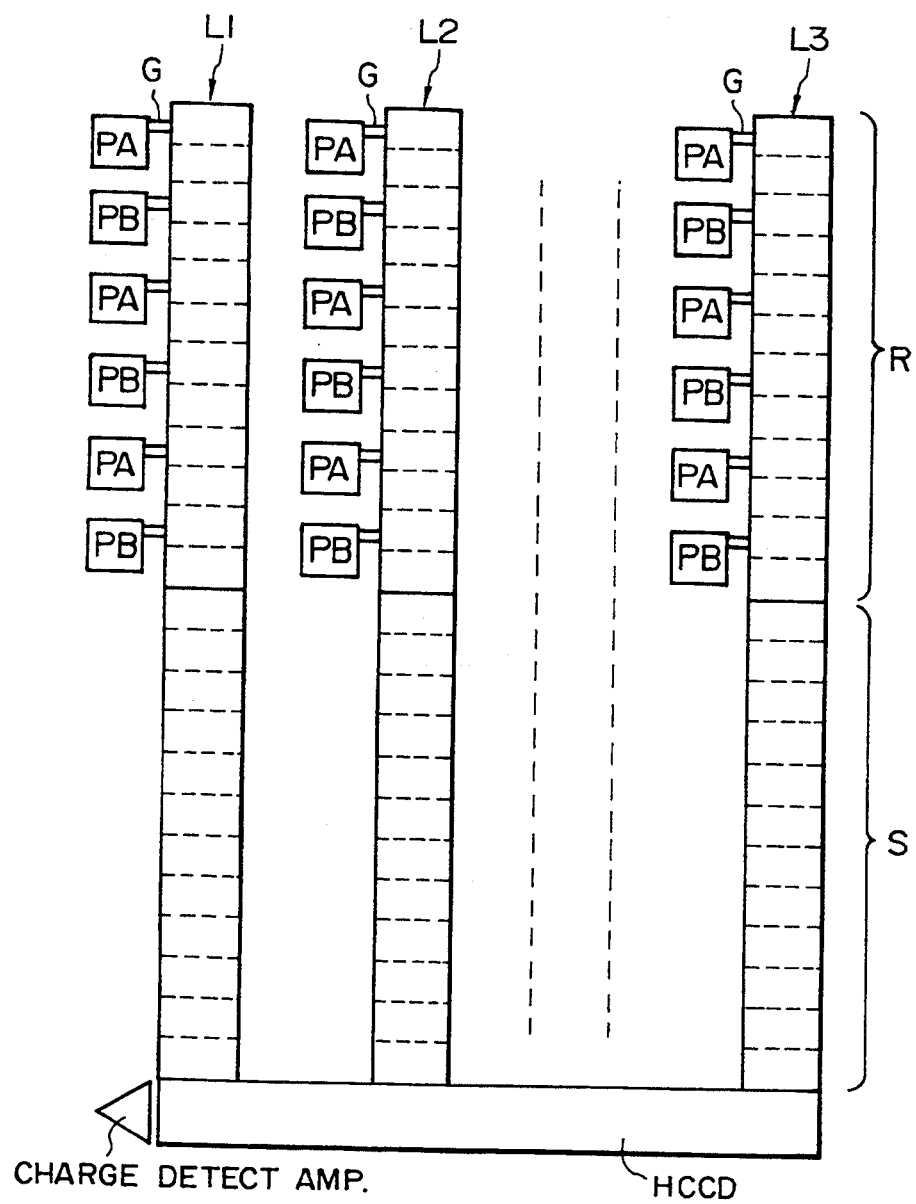
FIGS. 9A and 9B are conceptual diagrams explaining an FIT pseudo frame electronic shutter according to a prior art.
Figure 9B:
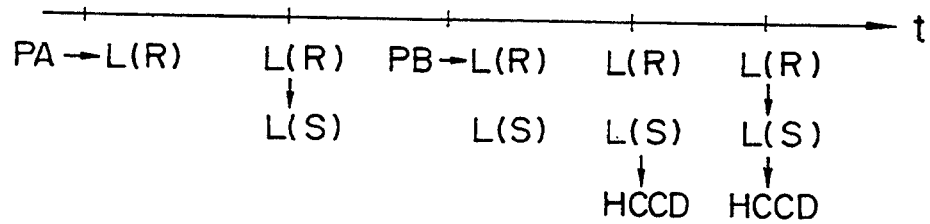

FIG. 5 is a circuit diagram showing the entirety of a solid state image pickup device having CCDs shown in FIG. 4. The VCCD 2 is provided for each row of photodiodes disposed in a matrix shape. The VCCD 2 includes a pixel section 11 disposed within an area of photodiodes and an empty packet section 12 disposed outside of the photodiode area. The HCCD 5 is provided at the ends of the empty packet section 12 of the VCCD, and electric charge signals are read from the HCCD 5 by an output amplifier 16.

On the left side of the pixel section 11, there is provided a control circuit 17 for supplying a charge holding signal to rows which are not supplied with the drive signals. On the right side of the pixel section 12, there is provided another control circuit 18 for controlling the charge transfer in the VCCD. The control circuit 17 has a circuit for supplying a field shift signal mFS for picking up electric charges from the photodiodes 1 to the VCCD 2.

The control circuit 18 has switching transistors to which eight-phase drive control signals V1 to V8 are applied via wirings, and a shift register 19 for supplying a signal to control the switching transistors. This shift register 19 has essentially the same structure as that of a shift register used by the domino transfer method. If the empty packet section 12 is omitted from the circuit shown in FIG. 5, a solid state image pickup device applying the charge transfer method of FIG. 1A can be realized.

FIGS. 6A and 6B are timing charts of control signals for the charge transfer using the circuit shown in FIG. 5.

FIG. 6A shows control signals φFS, φIn, φG, φA, φB, φRS, V1 to V8, and H1 and H2, respectively for the circuit shown in FIG. 5. The time period between rising pulses of the control signals mFS 1, 3 for example is one vertical period, e.g., about 100 msec. During the first half period of the vertical period during which the control signals φG, φA, and φB change, electric charges are transferred to the pixel section to the empty packet section, and at the same time empty packets are distributed in the VCCD. For example, this period is about 2.6 msec.

During each horizontal blanking period, electric charges are transferred in the VCCD in units of four rows. For example, one horizontal period is about 105 μsec. The control signals V1 to V8 supplied to the eight electrodes of the four rows are shown in FIG. 6B at a magnified scale.

The control signals V1 to V8, in the non-transfer state, take alternately the low level L and middle level M. In the transfer state, the signal levels are changed in such manner that they are shifted from each other by half the pulse width for the charge transfer. With such control signals, the electric charge moves upward one row within the four rows corresponding to V1 to V8. This drive method allows the charge transfer shown in FIG. 4.

FIG. 7 shows another embodiment of the charge transfer. In FIG. 7, the VCCD 2 and HCCD 5 of one column is shown in the vertical direction, and the time change is shown in the horizontal direction.

In this embodiment, empty packets are sent to the VCCD 2 in the similar manner to the embodiment shown in FIG. 1. The VCCD 2 has a pixel section 11 and empty packet section 12 to store electric charges overflown from the pixel section 11 in the empty packet section 12, in the similar manner to the embodiment shown in FIG. 4.

The charge transfer in the HCCD is not necessary until electric charges overflow from the empty packet, reducing the total time required for the charge transfer in the HCCD. As compared with the embodiment shown in FIG. 1, empty packets can be transferred to the top of the VCCD in a shorter time.

Drive signals at the VCCD are required to be applied only to the area where the electric charge is to be transferred, and the distance between empty packets can be set to a desired value. Accordingly, even if the distance between empty packets is set to a large value such as several tens rows, the charge transfer in the VCCD can be realized, for example, by a four-phase drive.

The present invention has been described in connection with the preferred embodiment. The present invention is not intended to be limited to the above-described embodiments, but various changes, improvements, and combinations are obvious by those skilled in the art.

We claim:

1. A method of driving a solid state image pickup device having a plurality of photoelectric conversion elements disposed in a matrix shape, a plurality of columns of vertical CCDs disposed adjacent to each column of the photoelectric conversion elements and capable of receiving, storing, and transferring electric charges accumulated in the photoelectric conversion elements, and a horizontal CCD connected to the plurality of columns of vertical CCDs and capable of receiving in parallel electric charges transferred from the vertical CCDs and serially outputting a stream of the electric charges, the method comprising the steps of:

receiving electric charges accumulated in all of said plurality of photoelectric conversion elements and storing the received electric charges in said vertical CCDs;

transferring an empty packet from said horizontal CCD to each of said vertical CCDs, said empty packet representing an area where no electric charge is present; and causing for each transfer cycle one row of electric charges in said vertical CCDs to be sequentially transferred to said horizontal CCD in relation to said empty packets being transferred two or more rows in said vertical CCDs, wherein said one row of electric charges are serially output by said horizontal CCD as said stream of electric charges.

2. A method of driving a solid state image pickup device according to claim 1, further comprising the step of:

dividing each of said vertical CCDs into groups each having n rows starting from the row nearest said horizontal CCD, wherein n is an integer, and wherein in said transferring step, the stream of electric charges stored in said horizontal CCD is serially outputted once every time an empty packet sent from said horizontal CCD moves in each of said vertical CCD by n rows, to generate one row of empty packets in said horizontal CCD.

3. A method of driving a solid state image pickup device according to claim 2, wherein each group of each of said vertical CCDs has a structure of m units each having k rows, wherein m and k are integers, and n=m×k, said method further including a step of supplying drive signals only to the unit at which an empty packet is moved, within an area where empty packets are distributed in each of said vertical CCDs, without supplying said drive signals to the other units.

4. A method of driving a solid state image pickup device according to any one of claims 1 and 2, wherein each of said vertical CCDs has a pixel section having the number of rows the same as the number of rows of the matrix of said photoelectric conversion elements and an empty packet section having a predetermined number of rows, the end of said empty packet section being connected to said horizontal CCD, said method further including a step of, after storing electric charges in said pixel section of each of said vertical CCDs, sequentially sending empty packets to said pixel section and storing electric charges overflown from said pixel section in said empty packet section.

5. A method of driving a solid state image pickup device according to claim 4, wherein said packet sending step is a step of distributing empty packets to every n-th rows counted from said horizontal CCD side within each of said vertical CCDs, and said transferring step drives each of said vertical CCDs by 2n-phase drive signals to transfer electric charges.

6. A solid state image pickup device, comprising:

a number of photoelectric conversion elements disposed in a matrix shape;

a plurality of columns of vertical CCDs disposed adjacent to each column of said photoelectric conversion elements and capable of receiving, storing, and transferring electric charges accumulated in said photoelectric conversion elements;

a horizontal CCD connected to said plurality of columns of vertical CCDs and capable of receiving in parallel electric charges transferred from said vertical CCDs and serially outputting the electric charges, each of said vertical CCDs being divided into groups each having n rows, and each group of each of said vertical CCDs having a structure of m units each having k rows, wherein n, m, and k are integers and $n = m \times k$; and a drive circuit for sequentially supplying drive signals only to a selected unit in each group of each of said vertical CCDs.

7. A solid state image pickup device, comprising:

a number of photoelectric conversion elements disposed in a matrix shape;

a plurality of columns of vertical CCDs, each of said vertical CCDs having a pixel section disposed adjacent to each column of said photoelectric conversion elements, capable of reading electric charges accumulated in said photoelectric conversion elements, and an empty packet section connected serially to said pixel section and having a predetermined number of rows;

a horizontal CCD connected to said plurality of columns of vertical CCDs and capable of receiving in parallel electric charges transferred from said vertical CCDs and serially outputting the electric charges; and a control circuit for controlling the reading of electric charges from all of said photoelectric conversion elements and storing the electric charges in said vertical CCDs, and for sending empty packets to the pixel section of said vertical CCDs from the empty packet section for storing the electric charges at a predetermined row interval of three or more rows.

* * * * *